(12) United States Patent
Sajadi et al.

(10) Patent No.: US 11,303,544 B2
(45) Date of Patent: Apr. 12, 2022

(54) AUTOMATED INFRASTRUCTURE SWITCH SYSTEMS AND METHODS

(71) Applicant: Intotoware Inc., Irvine, CA (US)

(72) Inventors: Nima Sajadi, Irvine, CA (US); Farsheed Atef, Rancho Santa Margarita, CA (US)

(73) Assignee: Intotoware Inc., Irvine, CA (US)

( * ) Notice: Subject to any disclaimer, the term of this patent is extended or adjusted under 35 U.S.C. 154(b) by 27 days.

(21) Appl. No.: 16/742,749

(22) Filed: Jan. 14, 2020

(65) Prior Publication Data

US 2020/0228423 A1 Jul. 16, 2020

Related U.S. Application Data

(60) Provisional application No. 62/792,317, filed on Jan. 14, 2019.

(51) Int. Cl.
| | | |
|---|---|---|
| *H04L 41/50* | (2022.01) | |
| *H04L 9/40* | (2022.01) | |
| *H04L 41/0893* | (2022.01) | |
| *G06F 9/455* | (2018.01) | |
| *H04W 12/06* | (2021.01) | |
| *H04W 88/06* | (2009.01) | |
| *H04L 29/06* | (2006.01) | |

(52) U.S. Cl.
CPC ...... *H04L 41/5077* (2013.01); *G06F 9/45558* (2013.01); *H04L 41/0893* (2013.01); *H04L 63/0272* (2013.01); *H04L 63/08* (2013.01); *H04W 12/06* (2013.01); *H04W 88/06* (2013.01); *G06F 2009/4557* (2013.01)

(58) Field of Classification Search
CPC . H04L 41/5077; H04L 63/08; H04L 41/0893; H04L 63/0272; H04L 43/16; H04L 43/0811; H04L 41/046; H04L 41/0886; H04L 41/0806; G06F 9/45558; G06F 2009/4557; H04W 12/06; H04W 88/06; H04W 84/00
See application file for complete search history.

(56) References Cited

U.S. PATENT DOCUMENTS

| | | | | |
|---|---|---|---|---|
| 7,945,036 B1* | 5/2011 | Tonogai | ............. | H04M 3/4228 379/201.12 |
| 8,566,401 B1* | 10/2013 | Hernacki | ............... | H04L 51/00 709/206 |
| 2018/0287864 A1* | 10/2018 | Hockett | ................ | G06N 20/00 |
| 2020/0059419 A1* | 2/2020 | Miller | ................ | H04L 41/5096 |

* cited by examiner

*Primary Examiner* — Walli Z Butt
*Assistant Examiner* — Shawn D Miller
(74) *Attorney, Agent, or Firm* — Klein, O'Neill & Singh, LLP

(57) ABSTRACT

An automated infrastructure switch system is disclosed, wherein an infrastructure switch is configured to automatically provision resources between electronic devices when those electronic devices are connected to internal network transceivers of the switch. The infrastructure switch automatically sets up a private cloud system for the connected devices, which can be connected to other private cloud systems on-demand. A cloud server can maintain connectivity between discrete private cloud systems, while also automatically providing access to common resources via a public cloud.

8 Claims, 2 Drawing Sheets

AUTOMATED INFRASTRUCTURE SWITCH SYSTEMS AND METHODS

CROSS-REFERENCE TO RELATED APPLICATIONS

This Applications claims priority to U.S. Patent Provisional Application No. 62/792,317, which was filed on Jan. 14, 2019, the entire contents of which is expressly incorporated herein by reference.

TECHNICAL FIELD

The present invention relates generally to business infrastructure systems and particularly, to automated business infrastructure systems.

BACKGROUND

Relying on IT service professionals for installing and maintaining business network infrastructure is not beneficial. Not only are IT service professionals costly, but their skill levels are not consistent between individuals, and custom-built business infrastructures may not be robust enough to handle changes to the business over time. In addition, when businesses migrate or move to a new location, it is difficult to find a new IT service professional in that area that can migrate the previous system without spending extraneous amounts of both time and money.

Therefore, there is a need for a system that an average user can use to easily install and maintain a business infrastructure without needing to depend upon in-person IT service professionals.

SUMMARY OF THE INVENTION

This brief summary has been provided so that the nature of the invention may be understood quickly. A more complete understanding of the invention can be obtained by reference to the following detailed description of the various embodiments thereof in connection with the attached drawings.

In one embodiment, an infrastructure switch comprises: a set of internal network transceivers; a set of external network transceivers; a processor; and a memory having software instructions that, when executed by the processor, configure the processor to: monitor the set of internal network transceivers to determine when a first local device and a second local device connect to at least some of the set of internal network transceivers; query the first local device to determine that the first local device comprises a computer system in response to detecting that the first local device is functionally connected to at least some of the set of internal network transceivers; automatically generate an account for the first local device in response to determining that the first local device comprises a computer system; query the second local device to determine that the second local device comprises a storage system in response to detecting that the second local device is functionally connected to at least some of the set of internal network transceivers; automatically generate a unique identifier used to access a first storage area of the second local device in response to determining that the second local device comprises a storage device; and provide authentication access to the first storage area to the first local device via the generated account.

In another embodiment, the software instructions are further configured to: automatically generate an email account for the generated account in response to determining that the first local device comprises a computer system; and provide authentication access to the email account via the generated account.

In another embodiment, the software instructions are further configured to: monitor the set of internal network transceivers to determine when a third local device connects to at least some of the set of internal network transceivers; query the third local device to determine that the third local device comprises a first telephone system in response to detecting that the third local device is functionally connected to at least some of the set of internal network transceivers; automatically generate a telephone number for the first telephone system in response to determining that the third local device comprises a telephone system; and automatically route calls to the telephone number to the first telephone system in response to generating the telephone number.

In another embodiment, the software instructions are further configured to: automatically save a call log of the first telephone system in the first storage area of the second local device in response to generating the telephone number for the first telephone system.

In another embodiment, the software instructions are further configured to: monitor the set of external network transceivers to determine when the processor can receive a signal from a cloud server via at least some of the set of external network transceivers; automatically authenticate with the cloud server in response to determining that the processor can receive the signal from the cloud server; receive identifier information of a cloud storage device from the cloud server via the set of external network transceivers; and provide authentication access to the cloud storage device to the computer system via the generated account in response to receiving identifier information of the cloud storage device.

In another embodiment, the software instructions are further configured to: authenticate with a cloud server on a network via at least one of the set of external network transceivers; and provide authentication access to the first storage device via the cloud server via at least one of the set of external network transceivers.

In another embodiment, the software instructions are further configured to: monitor the set of internal network transceivers to determine when a third local device connects to at least one of the set of internal network transceivers; query the third local device to determine that the third local device comprises a storage system in response to detecting that the third local device is functionally connected to at least one of the set of internal network transceivers; automatically generate another unique identifier used to access a second storage area of the third local device in response to determining that the third local device comprises a storage device; and automatically provide authentication access to the second storage area to the first local device via the generated account in response to generating the another unique identifier.

DETAILED DESCRIPTION OF THE DRAWINGS

Figure 1:
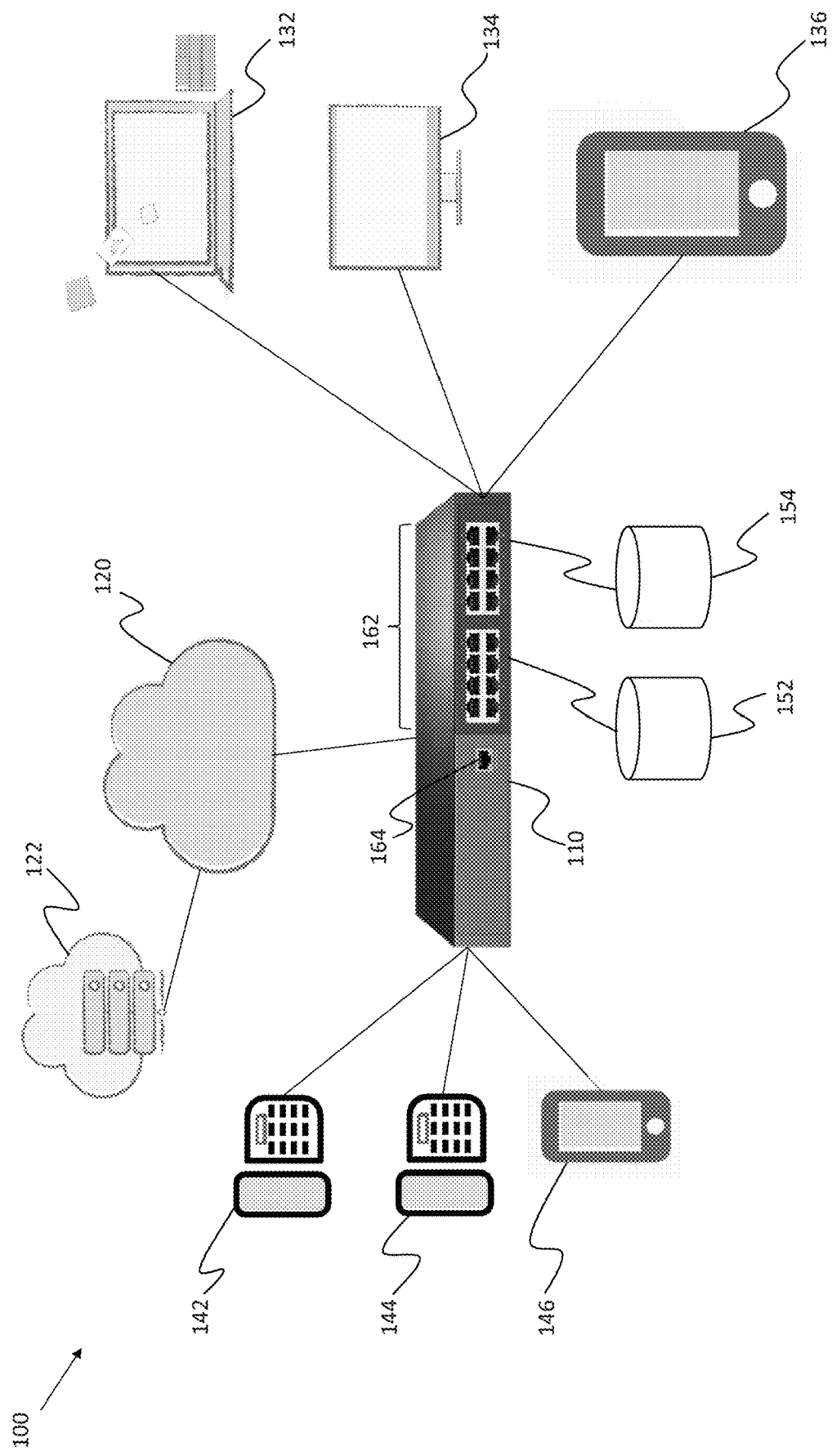
FIG. 1 shows exemplary infrastructure of a switch system having a plurality of computer devices and a server cloud.

An infrastructure switch system 100 is disclosed, in FIG. 1, comprising an infrastructure switch 110, an external network 120, a server cloud 122, computer devices 132, 134, and 136, telephonic devices 142, 144, and 146, and storage devices 152 and 154. Infrastructure switch 110 preferably comprises a set of internal network transceivers 162, a set of external network transceivers 164, a memory (not shown), and a processor (not shown). The memory of infrastructure switch 110 comprises a set of computer instructions that, when executed by the processor, perform the functions described herein. While a single memory, a single processor, a single external network transceiver, and sixteen internal network transceivers are disclosed, any number of memories, processors, external network transceivers, and/or internal network transceivers could be housed in infrastructure switch 110 in alternative embodiments. The internal and external network transceivers could also be wired or wireless.

As used herein, devices 132, 134, 136, 142, 144, 146, 152, and 154 are referred to as "internal devices" and devices 122 are referred to as "external devices." Internal devices are devices that are functionally directly coupled to at least one of the set of internal network transceivers of infrastructure switch 110 (e.g. via an Ethernet cable, fiber cable, Wi-Fi connection, Bluetooth connection, RF connection, infrared connection), while external devices are devices that are functionally coupled to at least one of the set of external network transceivers (e.g. Internet modem, an ISP port, satellite connection). While only one external network transceiver is shown in FIG. 1, the set of external network transceivers could comprise a set of more than one external network transceivers that provide access to a set of external devices 122 via some external network 120, such as the Internet. While the illustrated internal devices in FIG. 1 only show three computer devices 132, 134, 136, three telephonic devices 142, 144, and 146, and two internal storage devices 152 and 154, such devices are shown euphemistically to illustrate an exemplary set of internal devices, and more or less of any of the devices could be coupled to the set of internal network transceivers in alternative embodiments of the invention.

Infrastructure switch 110 is configured to provide a functional bridge between internal devices 132, 134, 136, 142, 144, 146, 152, and 154, and external devices 122. With such an infrastructure switch, an average user without in-depth knowledge of computers could couple infrastructure switch 110 to the internal devices and the computer software instructions on the memory of infrastructure switch 110 would easily provide infrastructure for all users of the internal devices with minimal setup and maintenance requirements. Infrastructure switch 110 and external devices 122 comprise a cloud infrastructure and AI services that automate building an organizational infrastructure for internal devices rapidly and easily with minimal user interaction. Preferably, upon entering in basic information, infrastructure switch 110 will setup firewalls and security for the internal devices, create accounts for individual users of computer devices 132, 134, and 136, provision phones for telephonic devices 142, 144, and 146, provision storage rules for internal storage devices 152 and 154 as well as external storage within external devices 122, allow files to be shared among users of computer devices 132, 134, and 136, among storage devices on computer devices 132, 136, 136, storage devices 152, 154, and external storage devices within external devices 122, provide both Wi-Fi and direct-connect router functionality, provide email services for users of computer devices 132, 134, and 136, provide apps provisioned by external devices 122 and/or infrastructure switch 110 itself to computer devices 132, 134, and 136, and provide a platform upon which internal users of computer devices 132, 134, and 136 could build internally and/or externally accessible apps (e.g. websites, web apps, mobile device apps). In preferred embodiments, infrastructure switch 110 transmits a query signal to any device connected to an internal transceiver and automatically provisions such resources accordingly. For example, when infrastructure switch 110 receives a signal that a connected device is a computer system, infrastructure switch 110 could then automatically create a user account with a username/password, which is accessible by an admin user connected to infrastructure switch 110, or when infrastructure switch 110 receives a signal that a connected device is a telephone, infrastructure switch 110 could automatically assign a telephone number to the telephone and allow incoming calls with that telephone number identifier to communicate with that telephone, or when infrastructure switch 110 receives a signal that a connected device is a storage device, infrastructure switch 110 could automatically assign an IP address to the storage device and allow that storage device to be accessible by other computer systems functionally coupled to infrastructure switch 110. Infrastructure switch 110 could also automatically provision private infrastructure relationships between the locally connected devices, such as providing access to a storage device to any computers whose created account holders have logged into those computers, or by saving voicemails or call log data from telephones on a storage device coupled to the infrastructure switch, which is accessible by any computers whose created account holders have logged into those computers. Any or part of the infrastructure information could be stored on a server cloud to allow the server cloud to easily provision resources between different infrastructure switches that share the same private network identifier.

Infrastructure switch 110 preferably monitors devices coupled to infrastructure switch 110, and automatically provisions resources based upon pre-provided security authentication information, and communicates with agents installed on the internal devices to keep the infrastructure up and running.

Infrastructure switch 110 provides several infrastructure platforms in a single device, described in detail below:
Cloud Network Infrastructure Infrastructure switch 110 generates and manages a hybrid cloud system comprising both public and private cloud infrastructure systems that are both accessible by computer devices 132, 134, and 136. In a preferred embodiment, infrastructure switch 110 automatically provisions all devices functionally directly coupled to at least one of the set of internal network transceivers to a private cloud infrastructure and all devices functionally coupled to at least one of the set of external network transceivers to a public cloud infrastructure.

In another embodiment, a plurality of infrastructure switches (not shown) could be coupled to external network 120, such as the Internet. Each of the plurality of infrastructure switches in such an embodiment preferably has a unique identifier, and is associated with an identifier of a private cloud infrastructure. In some embodiments, a plurality of infrastructure switches could have the same private cloud infrastructure identifier, for example an identifier of a common company. Preferably, during setup of infrastructure switch 110, an administrator user merely needs to enter in an identifier of a private cloud infrastructure, allowing devices from at least two private cloud infrastructures to share the same private cloud infrastructure with separate infrastructure switches.

For example, infrastructure switch 110 could be coupled to an Internet ISP in California while another infrastructure switch (not shown) could be coupled to an Internet ISP in New York. Administrators for both infrastructure switches would enter in a common identifier for a private cloud infrastructure, such as a company name, and the infrastructure switches would then automatically communicate with a cloud manager server to provision a common Intranet for all devices functionally directly coupled to the sets of internal network transceivers for each of the infrastructure switches sharing the same common identifier for the private cloud infrastructure. Once the private cloud infrastructures are joined to the same Intranet, computer devices on the same private cloud infrastructure are able to communicate with one another without a user needing to traverse security firewalls to communicate with a computer device—for example by sharing a common network domain and/or DNS. For example, a user of computer device 132 could see a shared printer in New York on her local network domain, and print a document to that shared printer without needing to enter in any security authentication parameters once an admin user joins the private cloud infrastructures for both infrastructure switches.

In other embodiments, infrastructure switch 110 could have a plurality of private cloud infrastructures, for example, a first private cloud infrastructure for computer device 132, 134, and storage device 152, and a second private cloud infrastructure for computer device 136, telephonic devices 142, 144, and 146, and storage device 154. Such private cloud infrastructure preferably has distinct identifiers, and can also share a common private cloud infrastructure with remote infrastructure switches coupled to external network 120, allowing bifurcation of private cloud infrastructures on a common infrastructure switch, and joining of private cloud infrastructures among multiple infrastructure switches.

Such private clouds are preferably managed by at least one cloud infrastructure manager in communication with the infrastructure switches. The cloud infrastructure manager preferably stores private cloud identifiers for each of the infrastructure switches, ensures that the private cloud identifiers are unique for each private cloud (e.g. that two different companies are unable to choose the same private cloud infrastructure identifier), and that security profiles are maintained for each private cloud identifier using known encryption protocols to maintain security. Preferably, at least one level of authentication is needed to join private cloud infrastructures with one another. The cloud infrastructure manager could provision automatic joining of shared network drives, automatic joining of telephone services (such that telephones in separate locations appear to share the same extension), automatic provisioning of a common email server, and coordination of communications between discrete sites, all with a single input of a shared private cloud infrastructure identifier from each infrastructure switch (and preferably an authentication, such as a username/password or a private password).

The public cloud infrastructure is preferably accessible to any infrastructure switch that is functionally connected and authenticated with could server 122. In other words, cloud server 122 could provide access to any device having public authentication access to cloud server 122. For example, the public cloud could have storage devices, SaaS applications, web servers, and email servers that are accessible to any members of the public cloud. Infrastructure switch 110 could, by virtue of authenticating with cloud server 122 as an authorized infrastructure switch (e.g. by sending an identifier and a password unique to infrastructure switch 110), provide access to any device of the public cloud that has been set up by a public cloud admin user to be accessible to public cloud members. In an exemplary embodiment, infrastructure switch 110 could automatically set up accounts and email addresses that are hosted on an email server which is part of the public cloud. Infrastructure switch 110 could then provide email access to the public cloud email server as part of the infrastructure switch services. In another embodiment, infrastructure switch could automatically provide access to public storage devices that are only accessible to accounts that have been set automatically generated for the computer devices 132, 134, and 136. SaaS applications could also be accessible via the public cloud, which can only be accessed by an infrastructure switch that has been authenticated with cloud server 122. In this manner, where private cloud access is automated by connection of an electronic device to an internal transceiver of infrastructure switch 110, public cloud access is also automated by the connection of infrastructure switch 110 to cloud server 122 via one of the external transceivers 164.

Preferably, infrastructure switch 110 is configured to automatically discover and connect with authorized cloud servers as part of an initialization process. For example, when infrastructure switch 110 boots up, infrastructure switch could be configured to automatically ping known IP addresses or DNS names of cloud server identifiers saved on a local storage, and authenticate with a cloud server, such as cloud server 122, which then provides an inventory of public cloud resources to infrastructure switch 110 and provides electronic access to the public cloud resources to any authenticated computer devices coupled to infrastructure switch 110.

Figure 2:
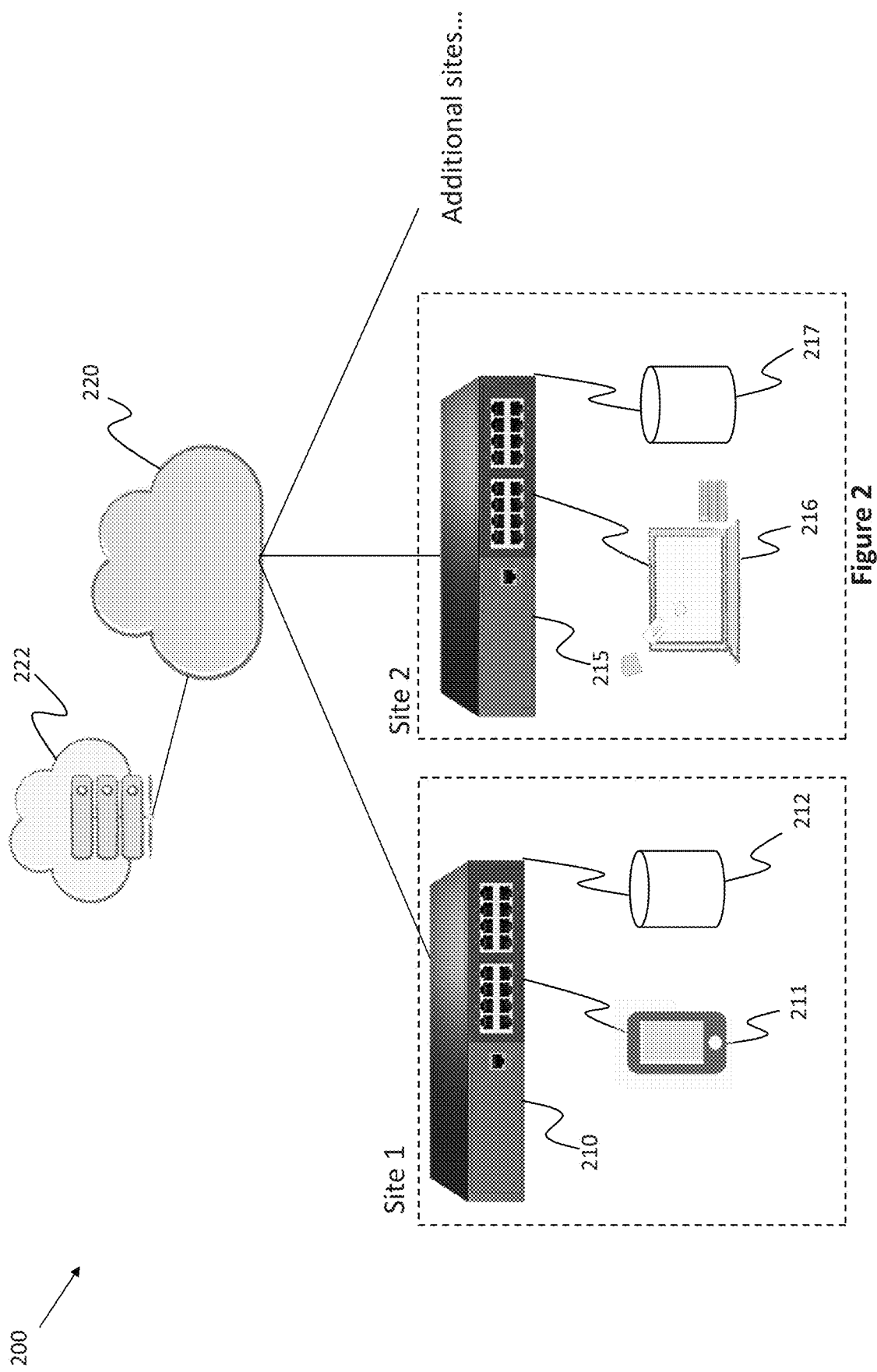
FIG. 2 shows exemplary infrastructure of a switch system having multiple sites functionally coupled together using a server cloud.

FIG. 2 shows an alternative infrastructure switch system 200 in which multiple discrete sites, site 1 and site 2, can share a common cloud server 222 using two discrete infrastructure switches 210 and 215. At least some portions of the external devices are preferably also provisioned to the private cloud infrastructure (e.g. share the same Intranet domain), such as a storage device (e.g. shared drive), an internal email company server, an Intranet web server, or an internal company application repository. Such external devices are preferably automatically provisioned without any user input, or can be automatically provisioned by the uploading of a corporate profile to infrastructure switches 210 and 215.

Here, site 1 has infrastructure switch 210 having external devices 211 and 212, where site 2 has infrastructure switch 215 having external devices 216 and 217. Preferably, infrastructure switch 210 automatically provisions a private cloud infrastructure to external devices 211 and 212 when they functionally couple to internal network transceivers of infrastructure switch 210 (e.g. by plugging into an Ethernet port or by connecting wirelessly to a Wi-Fi transceiver) and infrastructure switch 215 automatically provisions a private cloud infrastructure to external devices 216 and 217 when they functionally couple to internal network transceivers of infrastructure switch 215. Then, both of the infrastructure switches can join the two private cloud infrastructures when an admin user of the infrastructure switches designates a common identifier for both to use, such as a unique identifier of a private cloud infrastructure, preferably saved and managed by cloud server 222.

Infrastructure switches 210 and 215 also preferably also provides the internal devices access to a public cloud, such as the Internet, through a firewall connection. Some internal devices could be accessible by devices in the public cloud, for example a public website that can be edited by authorized devices in the private cloud network, but can be accessed by a public web browser via the public cloud via an unsecured HTTP session or a se cured HTTPS session. Another example could be a public FTP drive that can be written and read from by authorized devices in the private cloud network, but can only be read from via a public FTP connection, or can be written to via a public FTP connection that submits an authorized username/password.

Security

Infrastructure switch 110 preferably monitors traffic to/from internal devices and provides multiple firewall layers, particularly for external devices from the public cloud infrastructure that wish to gain access to a device in the private cloud infrastructure. Preferably, any external device requesting access to an internal device needs to first bypass at least a first level of authentication from a centralized security measure implemented for the entire private cloud infrastructure, such as a publicly available website, applet, or downloadable computer application.

Infrastructure switch 110 preferably automatically monitors network traffic to/from internal devices over time to create a security profile for each internal device. The monitoring could comprise, for example, reviewing IP headers (e.g. IP addresses), geo-location data (e.g. latitude/longitude, geolocation identifier), size of the packet, and other signature data. Each device could have a security profile associated with the historical trend data, and one or more thresholds could be monitored by a security application on infrastructure switch 110. When a threshold is exceeded, the security application preferably transmits a notification, and could be configured to automatically block traffic until an authorized user removes the traffic block. For example, an internal device could have a security profile that indicates that more than 80% of its network traffic comprises data packets having a United States geolocation. When the security application monitoring network traffic detects that less than 80% of its network traffic comprises data packets having a United States geolocation, the security application could transmit a notification to an administrator (e.g. via a text message, email) to inform that administrator that a security threat has been detected.

Infrastructure switch 110 preferably automatically generates such security thresholds based upon security profile generator templates provided by a centralized security server composing external devices 122. Such a centralized security server (not shown) could automatically update security templates to each infrastructure switch by default (e.g. push updates), or such security templates could be requested by the infrastructure switch in accordance with a user-defined setting (e.g. update security templates at midnight every Saturday).

The security application also preferably encrypts any data transmitted to external network 120, to ensure that even data saved on a private cloud infrastructure on a storage device on external device 122 is secure once that data is transmitted to any external device. In preferred embodiments, data that is transmitted between devices on a shared private cloud infrastructure coupled to different infrastructure switches are encrypted when they are transmitted to external network 120 and decrypted when they are downloaded from external network 120, such that data transmitted between devices coupled to the same infrastructure switch is not slowed down by an encryption/decryption process.

Storage

Infrastructure switch 110 preferably comprises an intelligent storage application that manages one or more shared storage devices for one or more private cloud networks of infrastructure switch 110. The intelligent storage application preferably provides an intelligent tiered storage structure that provides the most frequently accessed data to computer-readable medium the most rapidly accessed to internal devices requesting data. For example, in one embodiment, infrastructure switch 110 could have a high-speed memory located within a housing of infrastructure switch 110, a medium-speed memory located within storage device 152, a low-speed memory located within storage device 154, and a backup memory located within an external storage device of external devices 122. The intelligent storage application could preferably save the most frequently accessed data to high speed memory and offload lower-accessed data to slower memory. The intelligent storage application preferably mirrors all data saved on an internal device to the backup memory to minimize data loss in case of an emergency. Preferably, any data saved on an external device is encrypted, where the private key is only transmitted within the private cloud infrastructure.

The intelligent storage application on infrastructure switch 110 also preferably tracks files to prevent file duplicates from being saved among the internal devices—particularly for file backups to an external device. Pointers to files could be used to prevent file duplicates. The intelligent storage application also preferably saves files incrementally to provide version control, allowing a user to roll back a version of a file to a specific time period. For example, a user could submit a request to roll back a file to the version saved yesterday at 3:00 PM, and the intelligent storage application could rewind the file to that version via any known version control system.

The intelligent storage application preferably creates file-specific header data for each file to provision version control functionality and/or file location functionality. In preferred embodiments, the file-specific header data is saved on memory located within the housing of infrastructure switch 110, however, the file-specific header data could be added as a separate header to each file in some embodiments. The file-specific header data is preferably non-standard header data, for example the number or percentage of angry words in a document (calculated by matching words in a document against an internal database of "angry words"), or the number or percentage of political speech words in a document (calculated by matching words in a document against an internal database of "political speech words"). Such file-specific header data is preferably customized by a user of the system, and can be monitored using an agent on one or more internal devices, or by an agent on infrastructure device 110 itself, to transmit an alert when a pre-defined threshold has been detected by the agent. (e.g. 10% of emails contain political speech words, or at least 300 angry words have been detected in documents saved by a given user within a month).

Phone System

Infrastructure switch 110 preferably dynamically assigns a phone number an extension to each of telephone devices 142, 144, and 146, functionally coupled to an internal network transceiver of infrastructure switch 110. Telephone devices that are added to infrastructure switch 110 are preferably dynamically provided a phone number and extension, and telephone devices that are removed preferably have their number and extension dynamically removed and can be used for a new telephone device coupled to the system. In a preferred embodiment, when a new user of infrastructure switch 110 is created, the administrator can provision a telephone device and extension to that user, providing access to that phone's capabilities via the user's login credentials (e.g. a user enters in his LDAP credentials to his computer device login, which allows him to listen to voicemail via his computer device and alter his phone's status (e.g. to away from desk voicemail on 6 rings, to away from desk voicemail on 1 ring, to on vacation voicemail on 1 ring, custom forwarding))

Multi-Tenant Infrastructure

Preferably, infrastructure switch 110 provides multi-tenant architecture for all users, allowing an admin user to set which users have access to defined private cloud infrastructure, what telephone devices are provisioned to users, what applications are provisioned to users, what email address is provisioned to users, and what storage devices are provisioned to users. An admin user of infrastructure switch 110 preferably dynamically defines tenant users from a centralized location to dynamically provision resources to internal devices coupled to infrastructure switch 110, or to any device provisioned to a common private cloud infrastructure. The admin user can preferably push agents to all devices (computer devices, telephonic devices, storage devices) coupled to infrastructure switch 110, for example with an admin username/password common to all devices, which allows for ease of administration among the network devices. Such agents can preferably be used to install applications and/or updates remotely, and manage backup/recovery profiles.

Such agents could also be used to remotely administer to internal devices. For example, a user of computer device 132 could activate a locally installed agent for tech support help, which forwards the request to infrastructure switch 110, which then forwards the request via external network 120 to external device 122 managed by a remote technical support user. The remote technical support user could then remotely manage computer device 132 (with a pre-approved configuration from an admin user) and provide remote tech support without need for the tech support to physically come to the location of computer device 132.

Overall Switch Use

Using a single infrastructure switch comprising a single housing to provision so many different interrelated infrastructure elements (storage, email, telephone, security, private cloud access) minimizes the work needed to be performed by an administrator user installing and maintaining the infrastructure switch, and hence minimizes the knowledge needed to competently install and maintain the infrastructure switch.

Preferably, when infrastructure switch 110 is coupled to an external network and a plurality of internal devices, infrastructure switch 110 initiates a sequence to detect internal devices functionally coupled to infrastructure switch 110 and generate a default company profile and resources for that company (e.g. user accounts, storage provisions, public/private cloud infrastructure, phone systems), in accordance with a template. An administrator user preferably customizes that company profile with specific settings for that company, such as a company name, number of infrastructure switches, user login information (e.g. username/password), storage needs and resources, phone settings and call treatment, and a customized AI skillset (e.g. security threshold notifications, monitoring threshold notifications). By minimizing the steps taken to provision a corporate infrastructure as a function of the detected internal devices, pre-provided default templates, and customized user settings, setup of a company infrastructure can be optimized to a few steps.

While embodiments of the present invention are described above with respect to what is currently considered its preferred embodiments, it is to be understood that the invention is not limited to that described above. To the contrary, the invention is intended to cover various modifications and equivalent arrangements within the spirit and scope of the disclosure herein.

What is claimed is:

1. An infrastructure switch comprising:
a set of internal network transceivers;
a set of external network transceivers;
a processor; and
a memory having software instructions that, when executed by the processor, configure the processor to:
monitor the set of internal network transceivers to determine when a first local device and a second local device connect to at least some of the set of internal network transceivers;
when the first local device connects to at least some of the set of internal network transceivers, transmit a first query to the first local device to determine whether the first local device comprises a computer system or a different device in response to detecting that the first local device is functionally connected to at least some of the set of internal network transceivers;
receive a response to the first query from the first local device that the first local device comprises a computer system;
automatically generate an account for the first local device in response to determining that the first local device comprises a computer system;
when the second local device connects to at least some of the set of internal network transceivers, transmit a second query to the second local device to determine whether the second local device comprises a storage system or a different device in response to detecting that the second local device is functionally connected to at least some of the set of internal network transceivers;
receive a response to the second query from the second local device that the second local device comprises a storage system;
automatically generate a unique identifier used to access a first storage area of the second local device in response to determining that the second local device comprises a storage device; and
provide authentication access to the first storage area to the first local device via the generated account.

2. The infrastructure switch of claim 1, wherein the software instructions are further configured to:
automatically generate an email account for the generated account in response to determining that the first local device comprises a computer system; and
provide authentication access to the email account via the generated account.

3. The infrastructure switch of claim 1, wherein the software instructions are further configured to:
monitor the set of internal network transceivers to determine when a third local device connects to at least some of the set of internal network transceivers;
query the third local device to determine that the third local device comprises a first telephone system in response to detecting that the third local device is functionally connected to at least some of the set of internal network transceivers;
automatically generate a telephone number for the first telephone system in response to receiving a response from the third local device that the third local device comprises a telephone system; and automatically route calls to the telephone number to the first telephone system in response to generating the telephone number.

4. The infrastructure switch of claim 3, wherein the software instructions are further configured to:

automatically save a call log of the first telephone system in the first storage area of the second local device in response to generating the telephone number for the first telephone system.

5. The infrastructure switch of claim 1, wherein the software instructions are further configured to:

monitor the set of external network transceivers to determine when the processor can receive a signal from a cloud server via at least some of the set of external network transceivers;

automatically authenticate with the cloud server in response to determining that the processor can receive the signal from the cloud server;

receive identifier information of a cloud storage device from the cloud server via the set of external network transceivers; and provide authentication access to the cloud storage device to the computer system via the generated account in response to receiving identifier information of the cloud storage device.

6. The infrastructure switch of claim 5, wherein the software instructions are further configured to:

authenticate with a cloud server on a network via at least one of the set of external network transceivers; and provide authentication access to the first storage device via the cloud server via at least one of the set of external network transceivers.

7. The infrastructure switch of claim 1, wherein the software instructions are further configured to:

monitor the set of internal network transceivers to determine when a third local device connects to at least one of the set of internal network transceivers;

query the third local device to determine that the third local device comprises a storage system in response to detecting that the third local device is functionally connected to at least one of the set of internal network transceivers;

automatically generate another unique identifier used to access a second storage area of the third local device in response to determining that the third local device comprises a storage device; and automatically provide authentication access to the second storage area to the first local device via the generated account in response to generating the another unique identifier.

8. The infrastructure switch of claim 1, further comprising a single switch housing, wherein the single housing holds the set of internal network transceivers, the set of external network transceivers, the processor, and the memory.

* * * * *